United States Patent
Liu

(10) Patent No.: US 6,227,801 B1
(45) Date of Patent: May 8, 2001

(54) TURBINE ENGINE HAVING IMPROVED HIGH PRESSURE TURBINE COOLING

(75) Inventor: Xiaoliu Liu, Mississauga (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 09/299,877

(22) Filed: Apr. 27, 1999

(51) Int. Cl.$^7$ .................................................. F01D 1/00
(52) U.S. Cl. .................. 415/117; 416/97 R; 29/889.2; 29/889.22; 29/889.721; 29/889.722
(58) Field of Search .................................. 415/115, 116, 415/117; 416/95, 96 R, 97 R; 29/889.2, 889.22, 889.721, 889.722

(56) References Cited

U.S. PATENT DOCUMENTS

| | | |
|---|---|---|
| 2,401,826 | 6/1946 | Halford . |
| 2,620,123 | 12/1952 | Parducci . |
| 3,742,706 | 7/1973 | Klompas . |
| 3,826,084 | 7/1974 | Branstrom et al. . |
| 3,990,812 | 11/1976 | Radtke . |
| 4,170,435 | 10/1979 | Swearingen . |
| 4,217,755 * | 8/1980 | Williams ........................ 415/116 |
| 4,236,869 | 12/1980 | Laurello . |
| 4,291,531 * | 9/1981 | Campbell ........................ 415/116 |
| 4,296,599 | 10/1981 | Adamson . |
| 4,348,157 | 9/1982 | Campbell et al. . |
| 4,425,079 | 1/1984 | Speak et al. . |
| 4,428,713 | 1/1984 | Coplin et al. . |
| 4,462,204 | 7/1984 | Hull . |
| 4,472,107 | 9/1984 | Chang et al. . |
| 4,502,835 | 3/1985 | Yamagata . |
| 4,639,194 * | 1/1987 | Bell, III et al. .................. 416/244 |
| 4,657,482 | 4/1987 | Neal . |
| 4,697,981 | 10/1987 | Brown et al. . |
| 4,701,105 | 10/1987 | Cantor et al. . |
| 4,761,947 | 8/1988 | Hennecke et al. . |
| 4,815,272 | 3/1989 | Laurello . |
| 4,820,116 | 4/1989 | Hovan et al. . |
| 4,849,895 | 7/1989 | Kervistin . |
| 4,907,943 | 3/1990 | Kelch . |
| 5,003,773 * | 4/1991 | Beckwith ........................ 415/115 |
| 5,143,512 | 9/1992 | Corsmeier et al. . |
| 5,174,105 | 12/1992 | Hines . |
| 5,187,931 | 2/1993 | Taylor . |
| 5,209,652 | 5/1993 | Fischer et al. . |
| 5,275,534 | 1/1994 | Cameron et al. . |
| 5,311,734 | 5/1994 | Pope et al. . |
| 5,327,719 | 7/1994 | Mazeaud et al. . |
| 5,402,636 | 4/1995 | Mize et al. . |
| 5,440,874 | 8/1995 | Charier et al. . |
| 5,555,721 | 9/1996 | Bourneuf et al. . |
| 5,567,129 | 10/1996 | Bonardi . |
| 5,586,860 | 12/1996 | Bertrand et al. . |
| 5,862,666 | 1/1999 | Liu . |
| 5,996,331 * | 12/1999 | Palmer ........................ 415/115 |

FOREIGN PATENT DOCUMENTS

| | | |
|---|---|---|
| 252045 | 1/1988 | (EP) . |
| 801190 | 7/1936 | (FR) . |
| 2576358 | 7/1986 | (FR) . |
| 2614654 | 11/1988 | (FR) . |

* cited by examiner

Primary Examiner—Edward K. Look
Assistant Examiner—Hermes Rodriguez
(74) Attorney, Agent, or Firm—Jeffrey W. Astle

(57) ABSTRACT

A turbine engine having improved high pressure turbine cooling is disclosed. In the engine, relatively cool intermediate pressure (P2x) air is diverted from a region of a compressor section and over a high work turbine blade at a lower static pressure than the diverted air to cool the blade. Advantageously, as the diverted air is relatively cool, use of a conventional TOBI nozzle may be eliminated. Similarly, showerheads on the blade may be eliminated. As well, the diverted air may conveniently be used to seal a rear bearing compartment within the engine.

19 Claims, 3 Drawing Sheets

TURBINE ENGINE HAVING IMPROVED HIGH PRESSURE TURBINE COOLING

FIELD OF THE INVENTION

The present invention relates to turbine engines, and more particularly to turbine engines having improved high pressure turbine cooling.

BACKGROUND OF THE INVENTION

Turbine engines, such as those used as aircraft turbojets or turbofans typically include from front to rear, in the direction of fluid flow in the engine, fan, compressor, combustion and turbine sections within a housing. These sections include rotating components mounted on one or more coaxial shafts for rotation about a central axis of the engine.

The fan section draws air into the engine. It is compressed in the compressor section, and admixed with fuel in the combustion section where the mixture is ignited. Combustion gases exit the combustion section and drive one or more turbines within the turbine sections.

Typically a first stage, high pressure turbine ("HPT") blade forming part of the initial turbine section, is cooled to prevent melting by using uncombusted high pressure air, referred to as P3 air. Specifically, the P3 air is passed through a tangential on-board injector ("TOBI") nozzle. The TOBI nozzle reduces the relative total temperature of the P3 air typically by approximately 100° F. (55° C.). The reduced temperature P3 air is passed into a HPT disk/coverplate rotating cavity and over the HPT blade. There, the P3 air cools the HPT blade typically using showerhead cooling.

Use of high pressure P3 air, however, is thermodynamically inefficient. Moreover, a TOBI nozzle and ancillary components add weight to the engine. Similarly, showerhead cooling requires the machining of relatively complex components.

Accordingly, a more thermodynamically efficient method of cooling an HPT within a turbine engine is desirable. Moreover, an engine with reduced weight of components associated with HPT cooling is desirable.

SUMMARY OF THE INVENTION

Accordingly, it is an object of the present invention to provide a turbine engine, having improved HPT cooling.

In accordance with the present invention, relatively cool intermediate pressure air is diverted from a region of a compressor section within a turbine engine to flow over a turbine blade at a lower static pressure than the diverted air. Advantageously, as the diverted air is relatively cool, use of a conventional TOBI nozzle may be eliminated. Similarly, showerheads on the blade may be eliminated.

Conveniently, the diverted air may also be used to seal a rear bearing compartment of the engine.

In accordance with an aspect of the present invention, there is provided a turbine engine including a compressor section to compress intake air into high pressure air and intermediate pressure air; a combustion section in flow communication with the compressor section, to combust fuel with compressed air; a turbine section in flow communication with combustion gases from the combustion section, the turbine section comprising a rotating turbine blade wherein static pressure at the turbine blade is lower than the pressure of the intermediate pressure air; and a conduit having an inlet in flow communication with the intermediate pressure air and an outlet in flow communication with the turbine blade, thereby guiding the intermediate pressure air over the turbine blade.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate embodiments of the invention, by way of example only.

DETAILED DESCRIPTION

Figure 1:
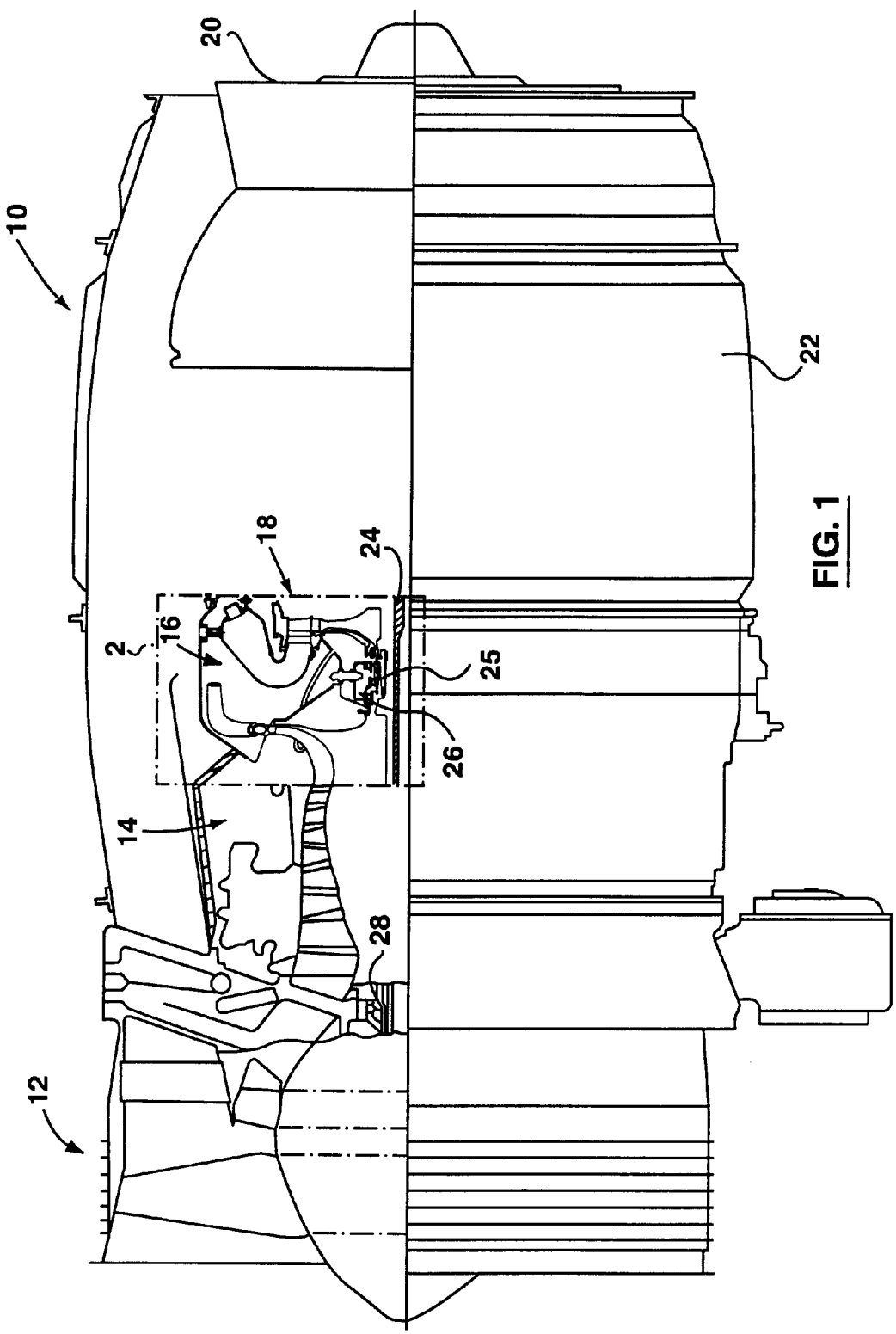
FIG. 1 is a side view of a turbine engine, in partial cross-section, exemplary of an embodiment of the present invention.

FIG. 1 illustrates a gas turbine engine 10, exemplary of an embodiment of the present invention. Engine 10 includes a fan section 12, and a core engine which includes, in flow series, a compressor section 14; a combustion section 16; a turbine section 18; and an exhaust section 20 all mounted within an engine housing 22.

Compressor section 14 preferably includes multiple compressor stages. Turbine section 18 preferably consists of a single turbine stage. However, turbine section 18 could include multiple turbine stages. At least one turbine within the turbine section 18 is rotationally coupled to the final stage of compressor section 14 by a longitudinally extending shaft 24. Shaft 24 is supported within housing 22 near its rear end by a roller bearing 25 within a roller bearing compartment 26 and near its front by thrust bearing assembly 28.

Figure 2:
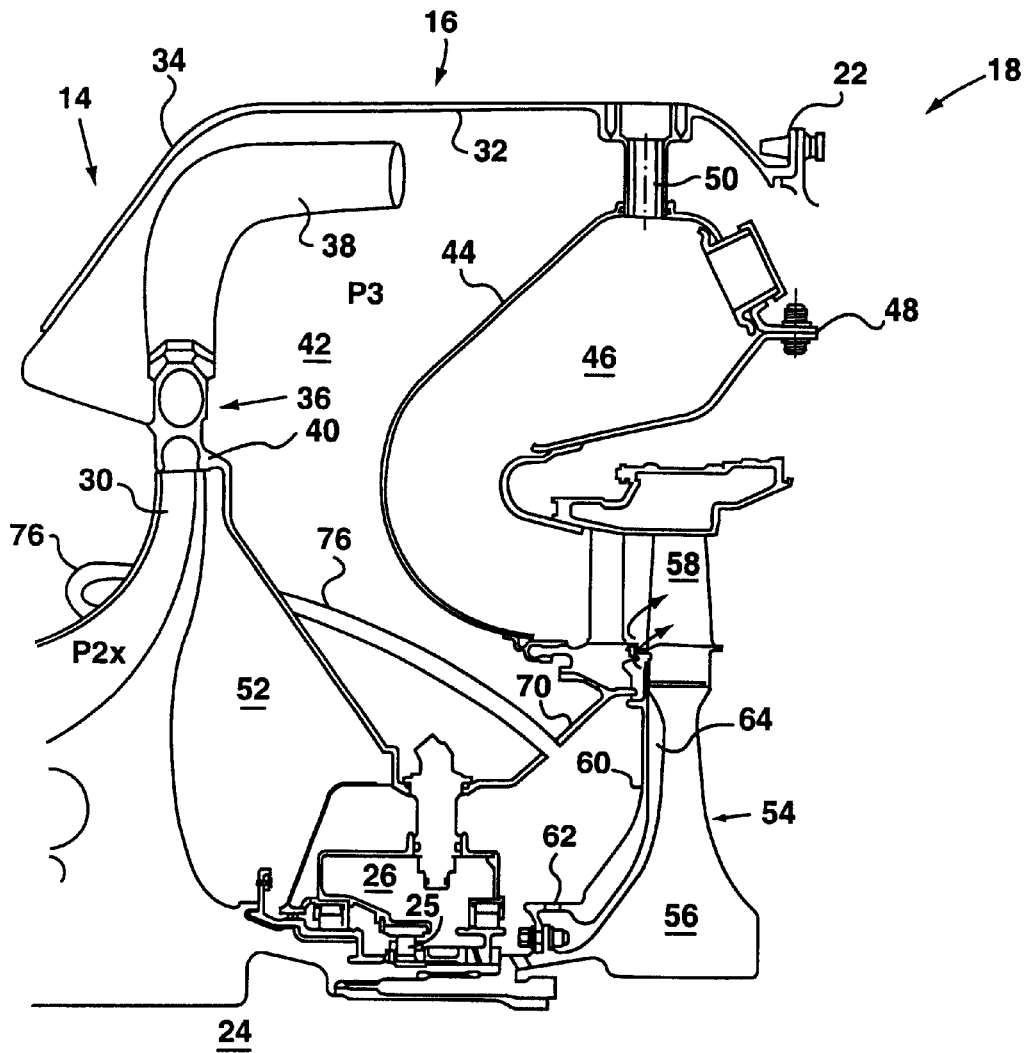
FIG. 2 is an enlarged cross-sectional view of a portion of FIG. 1.

FIG. 2 illustrates, in cross section, a portion of turbine engine 10, near the rear of compressor section 14 and the front of combustion section 16. As illustrated, the final stage of the compressor section 14 is preferably a rotating impeller 30 in flow communication with combustion section 16.

Combustion section 16 is formed on either side by a combustor case 32 and diffuser case 34 forming part of a diffuser assembly 36. This diffuser assembly 36 further includes a diffuser pipe 38 and support 40. Highest pressure "P3" air exits from the diffuser pipe 38.

Diffuser pipe 38 is located within combustion section 16, and provides flow communication between the tip of impeller 30 and combustion section 16, guiding compressed air from impeller 30 to a P3 region 42 of combustion section 16. As understood by those skilled in the art, and as detailed in U.S. patent application Ser. No. 08/771,906, diffuser pipe 38 serves primarily to reduce the tangential velocity of air exiting impeller 30.

Additionally, within combustion section 16 is combustor liner 44 defining combustion chamber 46 mounted to the engine housing 22 by case support 48. Combustion chamber 46 is in flow communication with P3 region 42. Also in flow communication with combustion chamber 46 is fuel nozzle 50.

Formed behind impeller 30 is impeller rear cavity ("IRC") 52. Roller bearing compartment 26 is formed just beneath and behind IRC 52.

Turbine section 18 includes high pressure turbine 54, which in turn includes a rotor 56 and blade 58. A cover plate 60 shields the cooling air from possible hot gas ingestion and defines rotating cavity 64. Holes 62 in cover plate 60 provide a conduit between combustion section 16 and rotor 56.

Pipes 76 extend from a region of intermediate pressure air of compressor section 14 emanating between the compressor section 14 and the output impeller 30. Pipes 76 extend to a baffle 70 just ahead of cover plate 60. Pipes 76 are preferably three hollow metal pipes having a ½" inner diameter.

In operation, fan section 12 (FIG. 1) draws air into engine 10. The air passes from fan section 12 to compressor section 14, where it is compressed by the multiple compressor stages. The final stage of compression is rotating impeller 30, illustrated in FIG. 2. High pressure air leaves the tip of impeller 30. The majority of this high pressure air is directed to combustion section 16 by diffuser pipe 38, from which P3 air exits. In combustion section 16, much of the P3 air enters chamber 46 and is admixed with fuel from nozzle 50 and combusted. Combusted gases leave chamber 46, near its rear and pass over turbine blade 58, thereby driving the HPT 54. As will be appreciated, exit gases from combustion chamber 46 are often at temperatures approaching or exceeding the melting temperature of blade 58. Cooling of blade 58 is therefore highly desirable.

Figure 3:
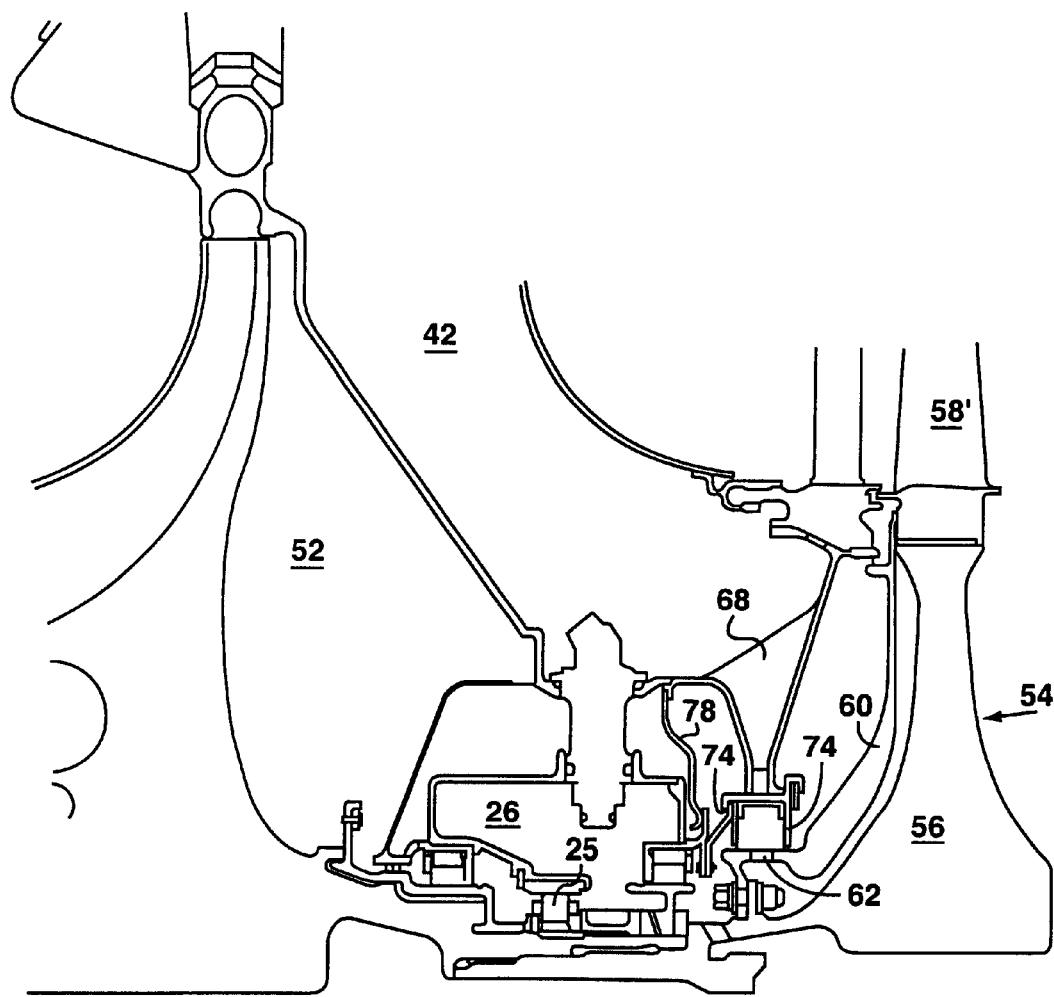
FIG. 3 is an enlarged cross-sectional view of a portion of a known turbine engine.

In a conventional turbine engine, as illustrated in FIG. 3 a turbine blade 58' is cooled by P3 air directed through holes 62 of the front cover 60, injected by way of TOBI nozzle 68. Cooling shower heads (not shown) on the turbine blade 58', as for example detailed in U.S. Pat. No. 5,779,437 then disperse the injected air over the blade 58' to keep the blade 58' from melting.

However, exemplary of the present invention and as illustrated in FIG. 2, a conduit including hollow pipes 76 directs intermediate pressure (known as P2x air) air from a lower pressure region of compressor section 14. Specifically, an inlet of the metal pipes 76 proximate a P2x region of compressor section 14 directs air to an outlet interconnected with baffle 70. This is possible largely because the leading edge of turbine blade 58 proximate is at a significantly lower static pressure than the static pressure at the tip of impeller 30, and more significantly, than some P2x air. As such, P2x air is diverted by pipes 76 from a P2x region having a higher pressure than the leading edge of the HPT blade 58, and may be the sole or primary source of cooling air for blade 58. Preferably, the air from the P2x region is chosen from a region of compressor section 14 having gases 30 p.s.i. (210 kPa) higher in pressure than the static pressure at the leading edge of blade 58. As should be appreciated, the pressure differential between the leading edge of blade 58 of the HPT 54 and the P2x air will not be present in all turbine engines. However, this pressure differential can be observed in most high work, single stage turbines, and possibly in the HPT blades of some multi-stage turbines. Baffle 70 and cover plate 60 define a region just ahead of cover plate 60. Air from this region is guided through holes 62 within cover plate 60; into cavity 64; in front of rotor 56; and eventually over blade 58, as illustrated.

Advantageously, P2x air is "thermodynamically cheaper" than P3 air. Its pressure is lower, and more advantageously, P2x air is at a lower temperature than P3 air preferably the P2x air used is about 300° F. (170° C.) lower in temperature. Consequently, the use of P2x air, and the resulting decrease in the use of P3 air in cooling the HPT blade 58 improves overall engine efficiency. More significantly, as the P2x air is lower in temperature than P3 air, showerheads formed as part of conventional HPT blades may be eliminated. Alternatively, showerheads that are less complex than conventional showerheads may be used.

Similarly, the use of a conventional TOBI nozzle that primarily serves to reduce the P3 air temperature is not required. As such, a TOBI nozzle 68 of a conventional engine illustrated in FIG. 3 can be eliminated. As understood by those skilled in the art, in a conventional turbine engine illustrated in FIG. 3, the P3 air is guided from cavity 42 to TOBI nozzle 68. From the exit of TOBI nozzle 68 air travels through holes 62 in front cover plate 60. This air is dispersed between cover plate 60 and rotor 56 and eventually over turbine blade 58'. Brush seals 74 maintain the high air pressure of air exiting TOBI nozzle 68 required for showerhead cooling. Further, a baffle 78 conventionally isolates TOBI nozzle 68 from roller bearing compartment 26.

Of equal significance, the use of reduced temperature P2x air (ie. air with a temperature, lower by about 300° F. or 170° C.) reduces the temperature around cover plate 60, and HPT 54 and thus improves engine life.

As well, because of the reduced air temperature, the cooling flow to HPT blade 58 can be reduced.

Further, the diverted P2x air may also be directed to the shaft 24 instead of P3 air. Because the P2x air is much cooler, shaft 24 can be made of steel instead of a temperature resistant alloy such as INCONEL™, which leads to cost reduction in engine construction.

Moreover, by using lower pressure P2x air and eliminating the showerheads, the required blade feed pressure is reduced. This, in turn, allows for the elimination of conventional brush seals 74 (FIG. 3), as illustrated in FIG. 2. Conveniently, then, air flow to blade 58 (FIG. 2) is no longer dependent on the wear of brush seals such as seals 74 (FIG. 3) improving the overall reliability of engine 10.

Additionally, as seals 74 are not required the P2x air guided by pipe 76 may also be directed to rear roller bearing compartment 26, which allows eliminating a conventional baffle 78 illustrated in FIG. 3, as illustrated in FIG. 2. Thus, redirected P2x air is at a higher pressure than that of the interior of bearing compartment 26 and thus seals the bearing compartment 26 in addition to cooling the HPT blade 58.

It will be further understood that the invention is not limited to the illustrations described herein which are merely illustrative of a preferred embodiment of carrying out the invention, and which are susceptible to modification of form, size, arrangement of parts and details of operation. The invention may easily implemented to modify existing engine designs other than the representative engine, described above. The invention, rather, is intended to encompass all such modification, as defined by the claims.

What is claimed is:

1. A turbine engine comprising:

a compressor section to compress intake air into high pressure air and intermediate pressure air, said intermediate pressure air having a lower pressure and temperature than said high pressure air and formed upstream of said high pressure air in said compressor;

a combustion section in flow communication with said compressor section, to combust fuel with compressed air;

a turbine section in flow communication with combustion gases from said combustion section, said turbine section comprising a rotating turbine blade wherein static pressure at said turbine blade is lower than the pressure of said intermediate pressure air; and a conduit having an inlet in flow communication with said intermediate pressure air and an outlet in flow communication with said turbine blade, thereby guiding said intermediate pressure air to said turbine blade to cool said turbine blade.

2. The turbine engine of claim 1, wherein said blade comprises a leading edge and static pressure proximate said leading edge is lower than the pressure of said intermediate pressure air.

3. The turbine engine of claim 2, wherein said turbine blade is part of a high work turbine.

4. The turbine engine of claim 2, wherein said turbine blade is the first turbine blade in said engine in flow communication with gases from said combustion section.

5. The turbine engine of claim 1, wherein said conduit comprises a pipe from said compressor section to said turbine section.

6. The turbine engine of claim 1 further comprising:
a cover plate between said combustion section and said turbine section, said cover plate at least partially isolating said turbine section from said combustion section, to limit back flow of hot gases from said turbine section to said combustion section said cover plate having a passageway therethrough acting as a portion of said conduit.

7. The turbine engine of claim 1, further comprising:
a bearing assembly supporting a rotating shaft, said bearing assembly located between said compressor section and said turbine section,
wherein said conduit further directs intermediate pressure air over said bearing assembly thereby sealing said bearing assembly.

8. The turbine engine of claim 1, wherein said turbine blade does not comprise a shower head cooling assembly.

9. The turbine engine of claim 1, wherein said conduit provides the primary source of cooling air to said turbine blade.

10. The turbine engine of claim 1, further comprising:
a rotating steel shaft interconnecting said turbine section to said combustion section, wherein said conduit further directs said intermediate pressure air to cool said steel shaft.

11. A method of cooling components within a turbine engine, said turbine engine comprising a compressor section, a combustion section, and a turbine section in flow communication, said method comprising:
diverting intermediate pressure air at a pressure higher than the static pressure of a rotating turbine blade within said turbine section, from a region of said compressor section upstream from an exit of highest pressure air entering said combustion section from said compressor section, to said turbine blade thereby cooling said turbine blade, said intermediate pressure air having a temperature lower than said highest pressure air.

12. The method of claim 11, wherein said diverting comprises diverting said intermediate pressure air to a leading edge of said turbine blade at a lower static pressure than the pressure of said intermediate pressure air.

13. The method of claim 11, further comprising:
diverting said intermediate pressure air over an exterior of a bearing assembly housing, housing at least one bearing seal said housing supporting a central shaft of said turbine engine.

14. The method of claim 11, wherein said intermediate pressure air is diverted over a high pressure turbine blade.

15. The method of claim 11, wherein said turbine blade is the first of multiple turbine blades in said engine in flow communication with gases from said combustion section.

16. A turbine engine comprising:
means for compressing intake air into high pressure air and intermediate pressure air; said intermediate pressure air having a lower temperature and pressure than said high pressure air, and formed upstream of said high pressure air;
means for combusting fuel admixed with compressed air from said means for compressing;
a turbine section in flow communication with combustion gases form said means for combusting, said turbine section comprising a turbine blade wherein static pressure at said blade is lower than the pressure of said intermediate pressure air; and
means for guiding said intermediate pressure air over said turbine blade, thereby cooling said blade.

17. The turbine engine of claim 6, further comprising a chamber to isolate said intermediate pressure air from said high pressure air, said chamber upstream of said turbine blade and in flow communication therewith.

18. The turbine engine of claim 17 further comprising a baffle upstream of said turbine blade, said baffle at least partially defining said chamber.

19. The turbine engine of claim 18, further comprising a bearing assembly supporting a rotating shaft, contained at least partially within said chamber so that said chamber directs intermediate pressure air over said bearing assembly thereby sealing said bearing assembly.

* * * * *